United States Patent
Huang et al.

(10) Patent No.: US 9,858,225 B2
(45) Date of Patent: Jan. 2, 2018

(54) USB TYPE-C CABLE AND METHOD FOR READING/WRITING A CHIP IN A USB TYPE-C CABLE

(71) Applicant: Richtek Technology Corp., Zhubei, Hsinchu County (TW)

(72) Inventors: Chien-Chih Huang, Shuishang Township, Chiayi County (TW); Chia-Hwa Chan, Zhubei (TW); Tsung-Nan Wu, Zhubei (TW)

(73) Assignee: Richtek Technology Corp., Zhubei, Hsinchu County (TW)

( * ) Notice: Subject to any disclaimer, the term of this patent is extended or adjusted under 35 U.S.C. 154(b) by 0 days.

(21) Appl. No.: 14/978,819

(22) Filed: Dec. 22, 2015

(65) Prior Publication Data
US 2016/0217307 A1  Jul. 28, 2016

Related U.S. Application Data

(60) Provisional application No. 62/108,180, filed on Jan. 27, 2015.

(51) Int. Cl.
| | | |
|---|---|---|
| G06K 19/00 | (2006.01) | |
| G06F 13/38 | (2006.01) | |
| G06F 1/00 | (2006.01) | |
| G06F 3/06 | (2006.01) | |
| G06F 13/42 | (2006.01) | |

(52) U.S. Cl.
CPC .............. *G06F 13/385* (2013.01); *G06F 1/00* (2013.01); *G06F 3/061* (2013.01); *G06F 3/0659* (2013.01); *G06F 3/0679* (2013.01); *G06F 13/4282* (2013.01); *G06F 2213/0042* (2013.01); *G06F 2213/3804* (2013.01)

(58) Field of Classification Search
USPC ........ 235/435, 439, 441–443, 451, 487, 492
See application file for complete search history.

(56) References Cited

FOREIGN PATENT DOCUMENTS

| | | |
|---|---|---|
| CN | 2579099 Y | 10/2003 |
| CN | 101256545 B | 9/2008 |

OTHER PUBLICATIONS

"Implementing Flexible USB Type-C Control Using FPGA Technology," A Lattice Semiconductor White Paper, Published Nov. 2014.*
Zheng Kevin, USB Type-C Configuration Channel(CC) pin function, Aug. 18, 2014, http://kevinzhengwork.blogspot.tw/2014/08/usb-type-c-configuration-channel-cc-pin.html. pp. 1-6.

* cited by examiner

*Primary Examiner* — Matthew Mikels
(74) *Attorney, Agent, or Firm* — Muncy, Geissler, Olds & Lowe, P.C.

(57) ABSTRACT

A method for reading/writing a chip in a USB type-C cable comprises converting a read/write command into unstructured vendor defined message (UVDM) that is conforming to a USB power delivery specification. Such UVDM will be delivered to the chip via a type-C configuration channel interface. The chip analyzes the UVDM to acquire the read/write command and reads or modifies the content of a non-volatile memory in the chip according to the read/write command. Due to use of the type-C configuration channel interface, which is inherent in the USB type-C cable, to read/write the chip, it needs no extra interface which otherwise increases costs.

2 Claims, 5 Drawing Sheets

USB TYPE-C CABLE AND METHOD FOR READING/WRITING A CHIP IN A USB TYPE-C CABLE

CROSS-REFERENCE TO RELATED APPLICATIONS

This application claims priority benefit of U.S. Provisional Patent Application No. 62/108,180, entitled "TYPE-C NON-VOLATILE MEMORY WRITER," filed Jan. 27, 2015, which is hereby incorporated by reference in its entirety.

FIELD OF THE INVENTION

The present invention is related to a USB type-C cable and a method for reading/writing a chip in a USB type-C cable.

BACKGROUND OF THE INVENTION

FIG. 1 shows a conventional method that utilizes a writer 2 to modify a non-volatile memory (NVM) 12 in a chip 4 of a universal serial bus (USB) type-C cable. When the writer 2 is connected to a writer pin 5 of the chip 4, a communication interface 6 will be established between the writer 2 and chip 4 for reading/writing the non-volatile memory 12 of the chip 4. The communication interface 6 can be an inter-integrated circuit (I²C) interface, a parallel interface, a serial interface, a USB interface, or a serial bus interface between integrated circuits. In the chip 4, an interface logic circuit 8 sends packets from the writer 2 to a controller 10. The controller 10 analyzes a communication protocol used by the communication interface 6 and reads/writes the non-volatile memory 12 according to the received packets. The non-volatile memory 12 can be a multi-time programmable (MTP) memory.

However, after the chip 4 is packed to a conventional USB type-C cable, there is only a type-C interface pin 7 in the chip 4 for an external connection to establish a type-C configuration channel (CC). The writer pin 5 is closed after the chip 4 is packed in the USB type-C cable. Accordingly, the writer 2 is unable to modify the non-volatile memory 12 via the writer pin 5. Namely, a parameter cannot be trimmed for debugging the USB type-C cable if there is any error. In other Words, in conventional methods, if the non-volatile memory 12 of the chip 4 is to be modified, the modification can be only executed before the chip 4 is packed in the USB type-C cable. If other interfaces, such as the USB interface, are to be utilized for modifying the non-volatile memory 12 the chip 4 that is packed in the USB type-C cable, extra costs are needed for building a communication protocol of a specific interface in the chip 4.

Therefore, it is desired a method that needs no extra costs and can modify the non-volatile memory of the chip in a USB type-C cable via an inherent type-C configuration channel interface.

SUMMARY OF THE INVENTION

An objective of the present invention is to provide a USB type-C cable and a method for reading/writing a chip in a USB type-C cable.

According to the present invention, a method for reading/writing a chip in a USB type-C cable comprises the steps of: converting a read/write command into an unstructured vendor defined message (UVDM) that is conforming to a USB power delivery specification, sending the UVDM to the chip in the USB type-C cable via a type-C configuration channel interface, and analyzing the UVDM to acquire the read/write command so as to read/write a non-volatile memory in the chip.

According to the present invention, a USB type-C cable comprises a chip. A type-C configuration channel interface will be established between the chip and a writer when the type-C cable is connected to the writer. The chip includes a non-volatile memory and a controller connected to the non-volatile memory. After receiving a UVDM that conforms to a USB power delivery specification from the writer via the type-C configuration channel interface, the controller analyzes the UVDM to acquire a read/write command. Then, the controller will read/write the non-volatile memory according to the read/write command.

The present invention utilizes the type-C configuration channel interface inherent in the USB type-C cable to send the UVDM so as to read/write the non-volatile memory of the chip in the USB type-C cable. Thus, the chip doesn't need to build extra communication protocol of specific interface as well as needs no extra costs.

BRIEF DESCRIPTION OF THE DRAWINGS

These and other objectives, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

A type-C configuration channel interface of a USB type-C cable can deliver a packet command set that conforms to a USB power delivery (PD). The present invention utilizes an unstructured vendor defined message (UVDM) in the packet command set to command a controller 10 to read/write a non-volatile memory 12. Accordingly, a chip 4 needs no extra communication protocol of specific interface as well as needs no extra costs.

Figure 1:
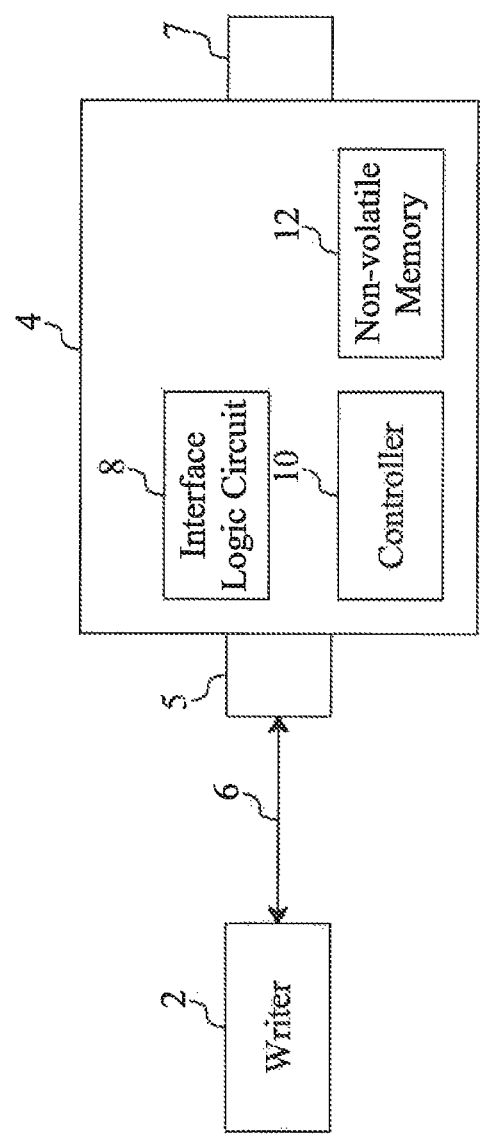
FIG. 1 shows a conventional method that utilizes a writer to modify a non-volatile memory in a chip of a USB type-C cable.
Figure 2:
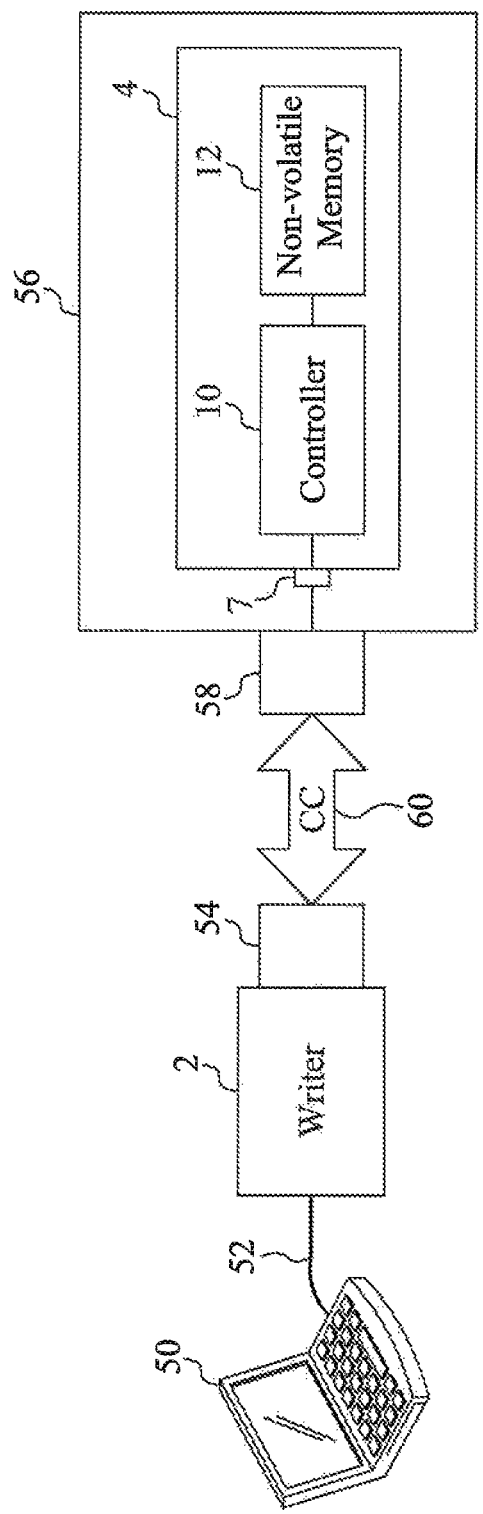
FIG. 2 illustrates a method for reading/writing a chip in a USB type-C cable.

FIG. 2 illustrates a method for reading/writing the chip 4 in the USB type-C cable 56. When a type-C connector 54 of a writer 2 is connected to a type-C plug 58 of the type-C cable 56, a type-C configuration channel interface 60 will be established between the writer 2 and a type-C interface pin 7 of the chip 4 in the USB type-C cable 56. A host 50 sends a read/write command to the writer 2 via an I²C interface 52. The read/write command includes a command to write to all sections of the non-volatile memory 12, a command to write to an open section of the non-volatile memory 12, a command to write to a non-open section of the non-volatile memory 12, or a command to read a data from the non-volatile memory 12. After the writer 2 converts the received read/write command into the UVDM that conforms to the USB PD specification, the writer 2 will send the UVDM to the chip 4 in the USB type-C cable 56 via the type-C configuration channel interface 60. The controller 10 of the chip 4 analyzes the received UVDM to acquire the correspondent read/write command. Thereafter, the controller 10 writes data into an address of a specific section of the non-volatile memory 12 or reads a data from an address of a specific section of the non-volatile memory 12 according to the read/write command. If the read/write command is a command for reading the data from the address of the specific section, the chip 4 will convert the read data into another UVDM that conforms to the USB PD specification and sends the another UVDM to the writer 2 via the type-C configuration channel interface 60.

The content of the UVDM can be decided by the vendor according to the practical needs. The UVDM is widely utilized. The present invention provides several common UVDM as examples. Referring to Table 1 to Table 8 as follows, every UVDM includes a header, a vendor defined message (VDM) header, and at least one vendor defined data object (VDO). In the UVDM, the content "VDMType=UVDM" in the column VDM HDR is fixed, but other content in the tables can be modified according to the practical needs.

TABLE 1

| | | | |
|---|---|---|---|
| ENTER TEST MODE UVDM | | | |
| HEADER | VDM HEADER | VDO1 | VDO2 |
| OBJ_NUM=TMCODE | VID=dedicated VID<br>VDMType=UVDM<br>CMDType=TMCODE | TESTCODE1 | TESTCODE2 |

TABLE 2

| | | | | | |
|---|---|---|---|---|---|
| WRITE TRIM REGISTER UVDM | | | | | |
| HEADER | VDM HEADER | VDO1 | VDO2 | VDO3 | VDO4 |
| OBJ_NUM=WTRIM | VID=dedicated VID<br>VDMType=UVDM<br>CMDType=WTRIM | REG33~<br>REG30 | REG37~<br>REG34 | REG3B~<br>REG38 | REG3F~<br>REG3C |

TABLE 3

| | | | | | |
|---|---|---|---|---|---|
| WRITE USER PAGE1 REGISTER UVDM | | | | | |
| HEADER | VDM HEADER | VDO1 | VDO2 | VDO3 | VDO4 |
| OBJ_NUM=WUSER1 | VID=dedicated VID<br>VDMType=UVDM<br>CMDType=WUSER1 | REG3~<br>REG0 | REG7~<br>REG4 | REGB~<br>REG8 | REGF~<br>REGC |

TABLE 4

| | | | | | |
|---|---|---|---|---|---|
| WRITE USER PAGE2 REGISTER UVDM | | | | | |
| HEADER | VDM HEADER | VDO1 | VDO2 | VDO3 | VDO4 |
| OBJ_NUM=WUSER2 | VID=dedicated VID<br>VDMType=UVDM<br>CMDType=WUSER2 | REG13~<br>REG10 | REG17~<br>REG14 | REG1B~<br>REG18 | REG1F~<br>REG1C |

TABLE 5

| | | | | | |
|---|---|---|---|---|---|
| WRITE USER PAGE3 REGISTER UVDM | | | | | |
| HEADER | VDM HEADER | VDO1 | VDO2 | VDO3 | VDO4 |
| OBJ_NUM=WUSER3 | VID=dedicated VID<br>VDMType=UVDM<br>CMDType=WUSER | REG23~<br>REG20 | REG27~<br>REG24 | REG2B~<br>REG28 | REG2F~<br>REG2C |

TABLE 6

TRIGGER MTP WRITE UVDM

| HEADER | VDM HEADER | Command (CMD) VDO |
|---|---|---|
| OBJ_NUM=WR | VID=dedicated VID<br>VDMType=UVDM<br>CMDType=WRCMD | {RREG_ALL, RMTP_ALL, WMTP_ALL}<br>{WMTP_TRIM, WMTP_USER, RDADDR} |

TABLE 7

MTP READ UVDM

| HEADER | VDM HEADER | CMD VDO |
|---|---|---|
| OBJ_NUM=RD | VID=dedicated VID<br>VDMType=UVDM<br>CMDType=RDCMD | {RREG_ALL, RMTP_ALL, WMTP_ALL}<br>{WMTP_TRIM, WMTP_USER, RDADDR} |

TABLE 8

EXIT TESTMODE UVDM

| HEADER | VDM HEADER |
|---|---|
| OBJ_NUM=EXITTM | VID=dedicated VID<br>VDMType=UVDM<br>CMDType=EXITTM |

Figure 3:
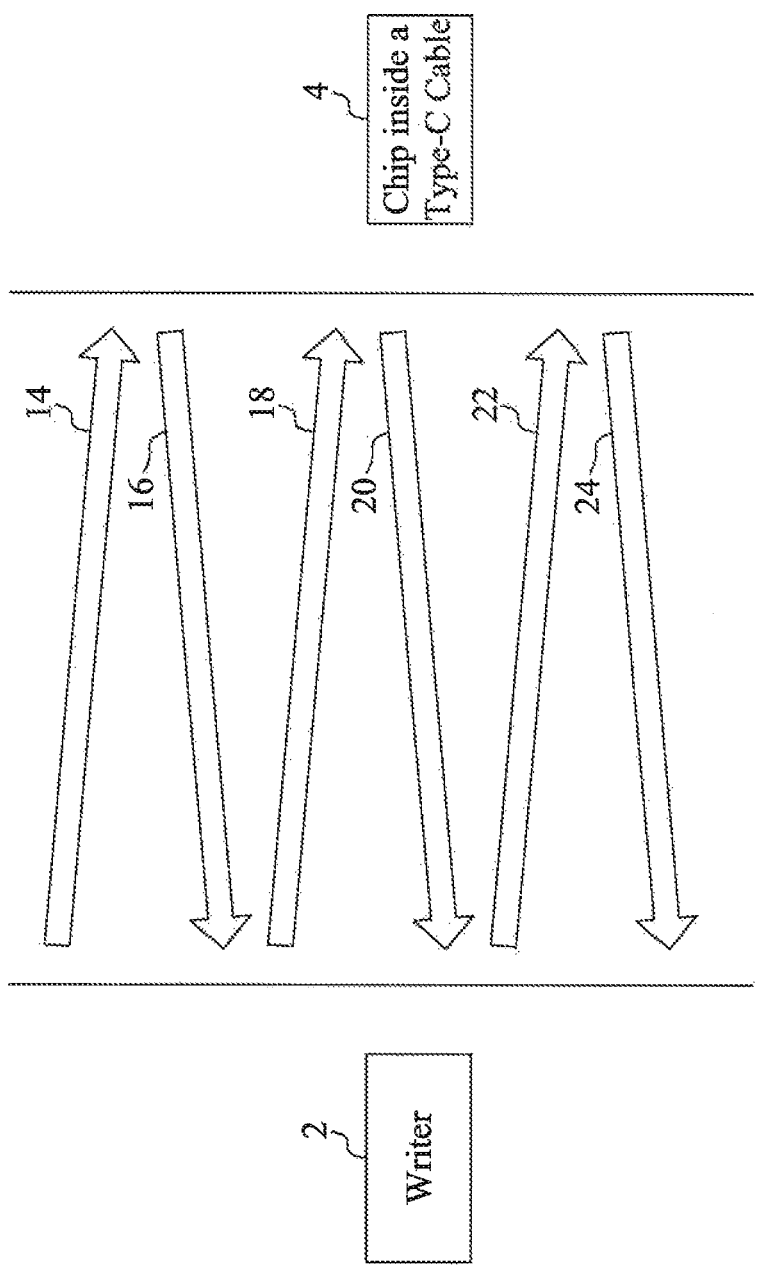
FIG. 3 shows a controlling procedure for writing a trim register.
Figure 4:
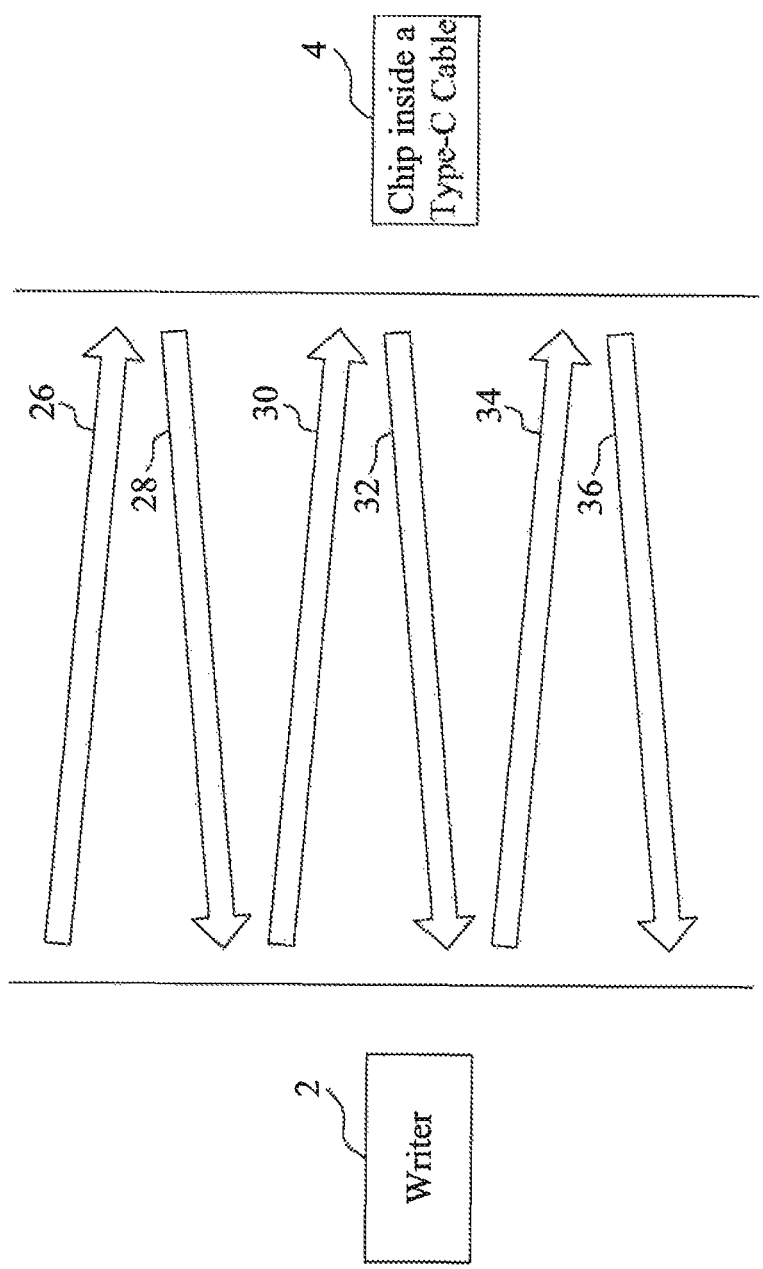
FIG. 4 shows a controlling procedure for writing a user page register.
Figure 5:
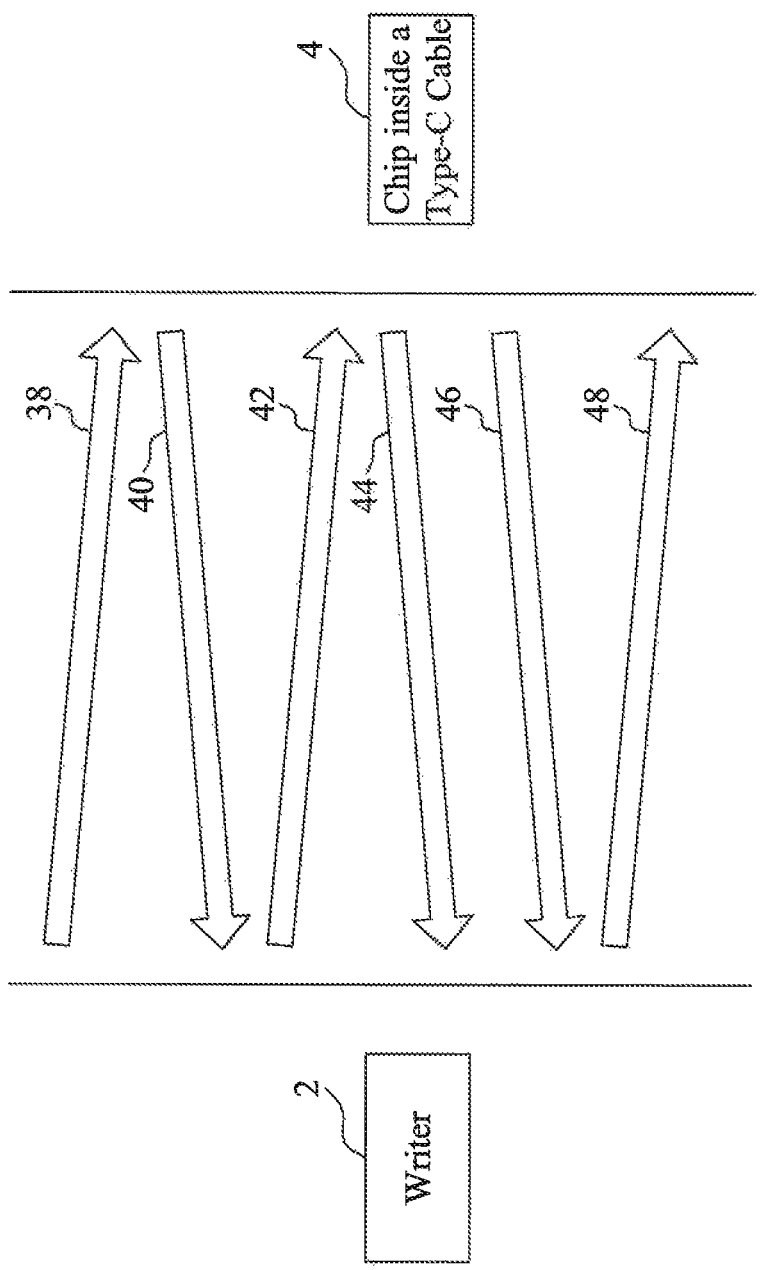
FIG. 5 shows a controlling procedure for reading a trim register or a user page register.

FIGS. 3 to 5 show some controlling procedures between the writer 2 and the chip 4 inside the type-C cable.

FIG. 3 shows the controlling procedure for writing a trim register. First, the writer 2 sends an ENTER TEST MODE UVDM 14 to the chip 4 inside the type-C cable, so that the chip 4 enters a test mode. After the chip 4 receives the ENTER TEST MODE UVDM 14, a confirmation code (GoodCRC) 16 will be sent back to the writer 2. After the writer 2 receives the confirmation code 16, a WRITE TRIM REGISTER UVDM 18 will be sent to the chip 4 so as to instruct an address of the non-volatile memory that is to be written. After the chip 4 receives the WRITE TRIM REGISTER UVDM 18, a confirmation code (GoodCRC) 20 will be sent back to the writer 2. After the writer 2 receives the confirmation code 20, a TRIGGER MTP WRITE UVDM 22 will be sent to the chip 4. After the chip 4 receives the TRIGGER MTP WRITE UVDM 22, a confirmation code (GoodCRC) 24 will be sent back to the writer 2. Then, the chip 4 will start executing a write operation of the non-volatile memory.

FIG., 4 shows the controlling procedure for writing a user page register. First, the writer 2 sends an ENTER TEST MODE UVDM 26 to the chip 4, so that the chip 4 enters a test mode. After the chip 4 receives the ENTER TEST MODE UVDM 26, a confirmation code (GoodCRC) 28 will be sent back to the writer 2. After the writer 2 receives the confirmation code 28, a WRITE USER PAGE REGISTER UVDM 30 will be sent to the chip 4 so as to instruct the address of the non-volatile memory that is to be written. After the chip 4 receives the WRITE USER PAGE REGISTER UVDM 30, a confirmation code (GoodCRC) 32 will be sent back to the writer 2. After the writer 2 receives the confirmation code 32, a TRIGGER MTP WRITE UVDM 34 will be sent to the chip 4. After the chip 4 receives the TRIGGER MTP WRITE UVDM 34, a confirmation code (GoodCRC) 36 will be sent back to the writer 2. Then, the chip 4 will start executing a write operation of the non-volatile memory.

FIG. 5 shows the controlling procedure for reading a trim register or a user page register. First, the writer 2 sends an ENTER TEST MODE UVDM 38 to the chip 4, so that the chip 4 enters the test mode. After the chip 4 receives the ENTER TEST MODE UVDM 38, a confirmation code (GoodCRC) 40 will be sent back to the writer 2. After the writer 2 receives the confirmation code 40, a READ TRIM REGISTER OR USER TRIM UVDM 42 will be sent to the chip 4 so as to instruct the address of the non-volatile memory that is to be read. After the chip 4 receives the READ TRIM REGISTER OR USER TRIM UVDM 42, a confirmation code (GoodCRC) 44 will be sent back to the writer 2. Then, the chip 4 converts the read data into a READ REGISTER RETUEN UVDM 46 to the writer 2. After the writer 2 receives the READ REGISTER RETURN UVDM 46, a confirmation code (GoodCRC) 48 will be sent back to the chip 4.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A USB type-C cable, comprising:
a chip configured such that a type-C configuration channel interface will be established between the chip and a writer when the type-C cable is connected to the writer, the chip including:
a non-volatile memory; and
a controller connected to the non-volatile memory and configured to operably analyze a first unstructured vendor defined message (UVDM) that is conforming to a USB power delivery specification to acquire a read/write command after receiving the first UVDM from the writer via the type-C configuration channel interface and read/write the non-volatile memory according to the read/write command.

2. The USB type-C cable of claim 1, wherein, when the chip reads data in the non-volatile memory according to the read/write command, the chip will converts the read data to a second UVDM that is conforming to the USB power delivery specification and send the second UVDM via the type-C configuration channel interface.

\* \* \* \* \*